United States Patent Office.

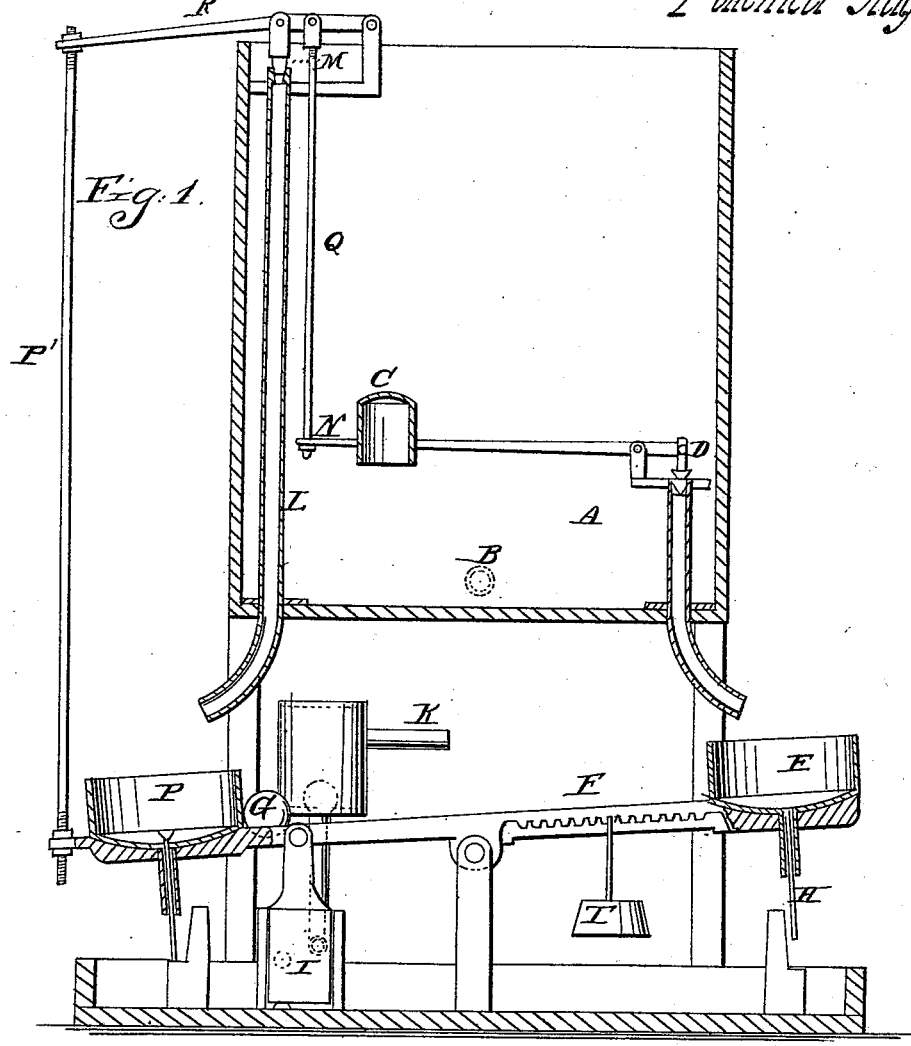
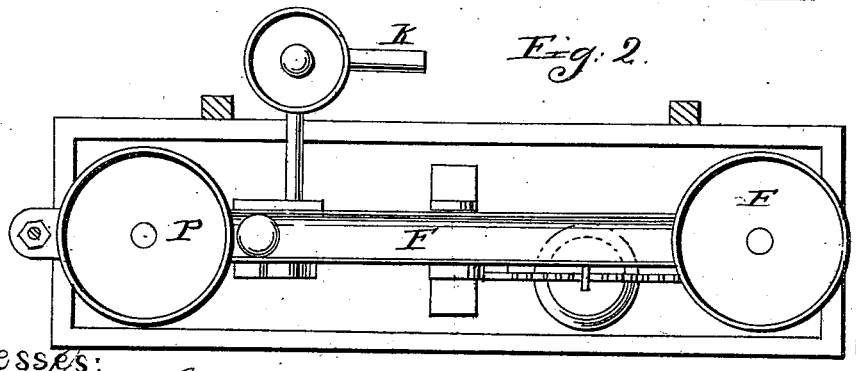

JAMES M. CROSE, OF LEBANON, INDIANA.

Letters Patent No. 94,288, dated August 31, 1869.

IMPROVEMENT IN TANK-REGULATOR.

The Schedule referred to in these Letters Patent and making part of the same.

*To all whom it may concern:*

Be it known that I, JAMES M. CROSE, of Lebanon, in the county of Boone, and State of Indiana, have invented a new and improved Regulating-Apparatus for Water-Tanks; and I do hereby declare that the following is a full, clear, and exact description thereof, which will enable others skilled in the art to make and use the same, reference being had to the accompanying drawings, forming part of this specification.

The object of this invention is to provide a simple and efficient self-acting water-supply regulating-apparatus for supply-tanks, for use in houses, steam-boilers, and other places.

The invention consists in a peculiar arrangement of valves, water-recesses, a tilting-bar, and balancing-weights, in connection with the water-tank and supply-pump, to be set into motion by a float in the tank when the water falls too low, for closing an air-passage to a constantly-moving pump, by which the tank is supplied, to cause the said pump to work for filling the tank, and to be operated by the surplus water to cause the pump to cease working, as required, by the supply of the water, as hereinafter more fully specified.

Figure 1 represents a longitudinal sectional elevation of a tank provided with my improved apparatus, and Figure 2 represents a horizontal section of the same.

Similar letters of reference indicate corresponding parts.

A represents the tank, which may be supplied through the pipe B, leading from any suitable pump, which may be continually operating.

C represents a float, which, when the water falls too low, opens a valve, D, which allows water to flow into a bucket, E, on a tilting-lever, F, whereon a ball, G, is placed, and which will roll down to the said bucket, and hold that end of the lever down after the water, which tilts the lever, runs out through a valve in the bottom, opened when the bucket goes down by the striking of the stem H thereof on a shoulder below.

When the lever is thus tilted, a gate or a valve, I, is moved to close an air-passage, previously open, leading to a pump, which may be connected in any way to the pipes K, for supplying the tank. The closing of this passage will permit the pump to take water again, and supply it to the tank A, the valve D being closed by the raising of the end N of the tilting lever, through the rods Q P' and lever R.

When the water has risen to the top of the pipe L, having a valve, M, in the top, which is opened by the rising of the end N of the lever F, it will run out thereat into the bucket P, tilting the lever back again to the position shown in the drawing, again opening the air-passage to the pump, and stopping the flow of the water. In this way the supply in the tank may always be maintained between the ends of the two escape-pipes.

The bucket P is also provided with a valve, which opens to permit the water to escape when it goes down.

The ball G also runs back to the bucket P, to hold it down when the lever goes down.

The water escaping from the buckets may be conveyed to the pump again in any preferred way. The lever F may be provided with an equalizing-weight, T.

Having thus described my invention,

I claim as new, and desire to secure by Letters Patent—

The combination of the tank A, escape-pipes and valve D, tilting-lever and buckets thereon, having escape-valves, air-passage valves I, weight G, rods P' Q, levers and float C, when arranged for operation by the water for opening and closing said air-passage, substantially as specified.

JAMES M. CROSE.

Witnesses:
JOHN M. ROSS,
JOHN ROSS.